(12) United States Patent
Norins, Jr. et al.

(10) Patent No.: US 8,271,337 B1
(45) Date of Patent: *Sep. 18, 2012

(54) SYSTEM AND METHOD FOR TRANSACTING FOR AN UPGRADE HAVING AN UNCERTAIN AVAILABILITY

(75) Inventors: Arthur L. Norins, Jr., Cupertino, CA (US); Arthur L. Norins, Cupertino, CA (US)

(73) Assignee: NOR1, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/753,798

(22) Filed: Jan. 8, 2004

Related U.S. Application Data

(60) Provisional application No. 60/505,929, filed on Sep. 25, 2003.

(51) Int. Cl.
  G06Q 30/00 (2006.01)
  G06F 17/30 (2006.01)
  G01C 21/34 (2006.01)
(52) U.S. Cl. .............. 705/26; 705/5; 705/6; 705/14; 705/27
(58) Field of Classification Search ............. 705/64, 705/5, 14, 26, 27
  See application file for complete search history.

(56) References Cited

U.S. PATENT DOCUMENTS

| 5,404,291 | A  | 4/1995  | Kerr         |
|-----------|----|---------|--------------|
| 5,757,917 | A  | 5/1998  | Rose         |
| 5,797,127 | A  | 8/1998  | Walker et al.|
| 5,845,265 | A  | 12/1998 | Woolston     |
| 5,873,069 | A  | 2/1999  | Reuhl et al. |
| 5,897,620 | A  | 4/1999  | Walker et al.|
| 6,064,987 | A  | 5/2000  | Walker et al.|
| 6,107,932 | A  | 8/2000  | Walker et al.|
| 6,112,185 | A  | 8/2000  | Walker et al.|
| 6,134,534 | A  | 10/2000 | Walker et al.|
| 6,138,105 | A  | 10/2000 | Walker et al.|
| 6,144,948 | A  | 11/2000 | Walker et al.|
| 6,202,051 | B1 | 3/2001  | Woolston     |
| 6,240,396 | B1 | 5/2001  | Walker et al.|
| 6,243,691 | B1 | 6/2001  | Fisher et al.|
| 6,269,343 | B1 | 7/2001  | Pallakoff    |
| 6,324,520 | B1 | 11/2001 | Walker et al.|
| 6,330,548 | B1 | 12/2001 | Walker et al.|
| 6,336,104 | B1 | 1/2002  | Walker et al.|
| 6,345,090 | B1 | 2/2002  | Walker et al.|
| 6,397,193 | B1 | 5/2002  | Walker et al.|

(Continued)

FOREIGN PATENT DOCUMENTS

JP          2001014409          1/2001

(Continued)

OTHER PUBLICATIONS

Dian Hymer: Seller not obligated until buyer's offer signed and delivered; the Sacramento Bee. Sacramento, Calif.; p. 1.1 Mar. 16, 1997.*

(Continued)

Primary Examiner — Charles C Agwumezie
(74) Attorney, Agent, or Firm — Greenberg Traurig, LLP

(57) ABSTRACT

The present invention enables the purchase of upgrades by ascertaining and attaching a value to the certainty that the upgrade will be available and adjusting the value of the product or service for purchasers willing to pay a reduced value on the condition that the upgrade may not be available at the time of expiration. Rather than paying the certainty value, the prospective purchaser is given the opportunity to enroll in a pool for the perishable upgrade. At a certain time the perishable is released to the pool of purchasers, who are then selected to purchase the item.

31 Claims, 7 Drawing Sheets

U.S. PATENT DOCUMENTS

| | | |
|---|---|---|
| 6,418,415 B1 | 7/2002 | Walker et al. |
| 6,466,919 B1 | 10/2002 | Walker et al. |
| 6,473,744 B1 | 10/2002 | Tuck et al. |
| 6,507,822 B1 | 1/2003 | Walker et al. |
| 6,553,346 B1 | 4/2003 | Walker et al. |
| 6,556,976 B1 | 4/2003 | Callen |
| 6,578,013 B1 | 6/2003 | Davis et al. |
| 6,587,838 B1 | 7/2003 | Esposito et al. |
| 6,594,641 B1 | 7/2003 | Southam |
| 6,598,024 B1 | 7/2003 | Walker et al. |
| 6,601,036 B1 | 7/2003 | Walker et al. |
| 6,606,603 B1 | 8/2003 | Joseph et al. |
| 6,631,356 B1 | 10/2003 | Van Horn et al. |
| 6,888,942 B2 | 5/2005 | Crockett |
| 6,970,837 B1 | 11/2005 | Walker et al. |
| 6,980,968 B1 | 12/2005 | Walker et al. |
| 6,988,077 B1 | 1/2006 | Walker et al. |
| 7,039,603 B2 | 5/2006 | Walker et al. |
| 2001/0032196 A1 | 10/2001 | Krespi |
| 2001/0056412 A1 | 12/2001 | Kutsuzawa et al. |
| 2002/0069093 A1* | 6/2002 | Stanfield .......................... 705/5 |
| 2002/0072999 A1 | 6/2002 | Andres et al. |
| 2002/0082969 A1 | 6/2002 | O'Keeffee et al. |
| 2003/0055744 A1 | 3/2003 | Walker et al. |
| 2003/0061145 A1* | 3/2003 | Norrid ............................ 705/37 |
| 2003/0061147 A1 | 3/2003 | Fluhr et al. |
| 2003/0093387 A1 | 5/2003 | Nakfloor |
| 2003/0154129 A1* | 8/2003 | Goff ................................ 705/14 |
| 2003/0177070 A1 | 9/2003 | Viswanath et al. |
| 2004/0093271 A1* | 5/2004 | Walker et al. ................... 705/14 |
| 2004/0093302 A1 | 5/2004 | Baker et al. |
| 2004/0117294 A1 | 6/2004 | Ferraro et al. |
| 2004/0133480 A1 | 7/2004 | Domes |
| 2004/0220821 A1 | 11/2004 | Ericsson |
| 2005/0261973 A1 | 11/2005 | Van Luchene |
| 2007/0021991 A1 | 1/2007 | Etzioni et al. |
| 2007/0250356 A1 | 10/2007 | Douglas |

FOREIGN PATENT DOCUMENTS

| | | |
|---|---|---|
| JP | 2001048143 | 2/2001 |
| JP | 2002074108 | 3/2002 |
| JP | 2002117266 | 4/2002 |
| JP | 2003150740 | 5/2003 |

OTHER PUBLICATIONS

Dian Hymer, Seller not obligated until buyer's offer signed and delivered, Sacramento Bee, p. 1.1, Mar. 16, 1997.*

Pascal Courty, "Some Economics of Ticket Resale," Journal of Economic Perspectives, vol. 17 (2), pp. 85-97, Spring 2003.

Ian Gale and Thomas Holmes, "Advance-Purchase Discounts and Monopoly Allocation of Capacity," The American Economic Review, vol. 83 (1), pp. 135-146, Mar. 1993.

Stephen Happel and Marianne Jennings, "Creating a Future Market For Major Event Tickets: Problems and Prospects," Cato Journal, vol. 21(3), pp. 443-461 Winter 2002.

Vibhu Kalyan, "Dynamic Customer Value Management: Asset values under Demand Uncertainty using Airline Yield Management and Related Techniques," Information Systems Frontiers, vol. 4(1) pp. 1011-1119 Apr. 2002.

Howard Marmorstein et al, "Unleashing the Power of Yield Management in the Internet Era: Opportunities and Challenges" California Management Review vol. 45 (3) pp. 147-167 Spring 2003.

Biyalogorsky; "Research Note: Overselling with Oportunistic Cancellations"; Marketing Science; 1999; vol. 18, No. 4, pp. 605-610.

Biyalogorsky; "Contingent Pricing to Reduce Price Risks"; Marketing Science; vol. 23, No. 1; Winter 2004; pp. 146-155.

Biyalogorsky; Marketing in Israel Seminar, Winter 2001; various seminar abstracts.

Biyalogorsky; "The Economics of Service Upgrades"; Journal of Service Research, vol. 7; No. 3; Feb. 2005; pp. 234-244.

McGill, et al; "Revenue Management: Research Overview and Prospects"; Transportation Science; vol. 33; No. 2; May 1999; pp. 233-256.

Callego; "Revenue Management of Flexible Products"; Oct. 6, 2004; pp. 1-31.

Høj Kjeldsen, et al; "Revenue Management-Theory and Practice"; Technical University of Denmark; Feb. 17, 2005; 200pgs.

You; Airline Seat Management with Rejection-For-Possible-Upgrade Decision; Elsevier Science Ltd; 2001; Transportation Research Part B; pp. 507-524.

Weatherford, et al; A Taxonomy and Research OVerview of Perishable-Asset Revenue Management: Yield Management, Overbooking, and Pricing; Operations Research Forum; vol. 40, No. 5; Sep.-Oct. 1992; pp. 831-845.

Dian Hymer, Seller not obligated until buyer's offer signed and delivered, Sacramento, Calif: Mar. 16, 1997, p. 1 http://proquest.umi.com/pqdweb?did=141977637&sid=6&Fmt=3&clientld=19649&RQT=309&VName=PQD.

International Search Report (PCTUS04/30791).

* cited by examiner

SYSTEM AND METHOD FOR TRANSACTING FOR AN UPGRADE HAVING AN UNCERTAIN AVAILABILITY

CROSS-REFERENCE TO RELATED APPLICATIONS

This application is a claims priority from U.S. provisional application Ser. No. 60/505,929 entitled METHOD AND SYSTEM THAT ENABLES PERISHABLE OBJECT COMMERCE BY ASSOCIATING DECREASED COST WITH INCREASED ACQUISITION UNCERTAINTY, filed Sep. 25, 2003, and the complete contents of that application are incorporated herein by reference.

This application is related to co-pending application entitled SYSTEM AND METHOD FOR TRANSACTING FOR A PERISHABLE OBJECT HAVING AN UNCERTAIN AVAILABILITY, filed concurrently herewith, and the complete contents of that application are incorporated herein by reference.

BACKGROUND OF THE INVENTION

Many objects including travel, events, products, services have a finite life with an abrupt ending associated with a complete or partial loss of value. Other objects approach this finite life behavior. All of these objects can be considered to be perishable. If these finite life objects are not sold prior to their death they go unused and are wasted. A seat on an airplane that has not been sold at departure goes unused and the potential revenue from its sale is lost. A seat at a concert that goes vacant has no value after the performance. There are a variety of business methods but none are optimally able to prevent this loss. Furthermore, many of these markets for perishable objects have established purchaser's of the objects, but because these customers' are price sensitive, more lucrative upgrades are lost as such customers will settle for more basic services. Using the airline flight as an example, seats in first class for that flight may be available and many existing coach or business class ticket holders for that flight would be willing to upgrade to a first class flight but for cost differential between the basic flight service and the upgraded flight service.

Consider the common business methods. The standard method places a price for an object. At that price it can be expected that a certain number of the objects will be sold in a period of time. If the objects are not selling well the price can be lowered and additional objects can be sold. Buyers who require the object will buy at the original offering price. Potential buyers who do not wish to pay the price will often delay their purchase hoping for a lower sale price. This delays selling, promotes price reductions and diminishes total revenue. In another common practice, a price is set and bargaining ensues between the buyer and seller until a price is reached that the buyer and seller agree upon and there is a sale; or when there is no meeting of the minds there is no sale. Haggling in this manner has to be repeated for each object. In an auction business method a number of buyers bid for the object; the highest bidder buys the object. Another common method is the use of an option, wherein the potential buyer pays to secure the right to buy an object at a future time. The holder of the option can be certain that he or she will be able to purchase the object so long as the option exists. This is because the seller is obligated not to sell the object in order to fulfill the obligation to deliver if the option is exercised. This method does not encourage sales and leaves the buyer with certainty that the object will be available.

In a variation of the auction method a price is set and then lowered until there is a bidder. If in any of these methods there is the additional constraint of a finite life to the object, then the seller is often ultimately forced to dramatically decrease the price in hope of a last minute sale or accept total loss.

Several patents are disclosed that illustrate different business methods involved in the sale of an object. For example, U.S. Pat. No. 6,606,603, issued on Aug. 12, 2003 to Josh Joseph et al., describes a method for ordering items using an electronic catalog. In the system a customer through an index has the advantage of examining a plurality of suppliers. There is no ability however to make an agreement in advance to buy perishable objects at a reduced cost.

U.S. Pat. No. 6,594,641, issued on Jul. 15, 2003 to Adam Southam, describes a computer facilitated selling system. In this system the buyer is aided in finding the source supplier of an object. The system allows the supplier to recognize their local retail distributor that was by-passed by the buyer and reward the retailer with a commission. It does not offer a new fundamental method of doing business.

U.S. Pat. No. 6,587,838, issued on Jul. 1, 2003 to Augustine Esposito et al., describes a method for conducting real time electronic commerce. This method is capable of connecting a buyer with many vendors. It offers no mechanism for aggregating a group of buyers interested in the sale of surplus perishable objects at a reduced cost.

U.S. Pat. No. 6,578,013, issued on Jun. 10, 2003 to Rose Davis et al., describes a method for communicating between supplier and customer devices. This system is used for the repeat buyer who has information stored with the supplier regarding the buyer and type of objects usually purchased. This is an aid in the purchasing process and could be used for perishables. It does not provide a mechanism for the buyer to make an advanced agreement to buy the object if the price is lowered.

U.S. Pat. No. 6,556,976, issued on Apr. 29, 2003 to Kevin Callen, describes a system for transacting e-commerce. The system includes a process for recognizing areas for cost reduction. There is no mechanism for handling acquisition uncertainty.

U.S. Pat. No. 6,553,346, issued on Apr. 22, 2003 to Jay Walker et al., describes a management system for packages of goods or services. The transaction involves a conditional purchase order in which there is an early agreement involving holding individual parts of the package for a set time. This business method does not address the needs of selling perishable objects with an established reduced cost associated with acquisition uncertainty.

U.S. Pat. No. 6,507,822 issued on Jan. 14, 2003 to Jay Walker et al., describes a method of managing the sale of a product over a period of time. It addresses the problem of recognizing the need to have a method of reducing an object's price the longer it remains unsold. This aids an essentially standard marketing procedure.

U.S. Pat. No. 6,473,744, issued on Oct. 29, 2002 to David Tuck et al., describes a method for trading electric energy. It permits the various buyers and sellers to have a view of what is being currently offered. This information enables purchasing. It does not address the problem of a seller who recognizes the possibility of future excess supply that could go unused. There is no mechanism for being able to reach an agreement with buyers for possible sale of this excess energy at a lower cost with acquisition uncertainty.

U.S. Pat. No. 6,466,919, issued on Oct. 15, 2002 to Jay Walker et al., describes a management system for aggregating purchase orders from a number of buyers and then determining best pricing. The purchase orders by the buyers have requirements placed on them in order to be effected. The system does not address the problem of perishables being sold at a lowered cost associated with acquisition uncertainty.

U.S. Pat. No. 6,418,415, issued on Jul. 9, 2002 to Jay Walker et al., describes a management system for aggregating purchase orders from a number of buyers. The purchase orders have requirements placed on them in order to be effected.

U.S. Pat. No. 6,345,090, issued on Feb. 5, 2002 to Jay Walker et al., describes a management system whereby calling parties can submit purchase orders to various long distance carriers in order to achieve low pricing. There are restrictions set up by the calling party and if they are met the calling party is committed to use the service. In this method the calling party does not know what the final price will be; it is essentially an aid to the standard process of getting the supplier with the lowest bid for the indicated service.

U.S. Pat. No. 6,269,343, issued on Jul. 31, 2001 to Matthew Pallakoff describes a system that allows sellers to communicate conditional offers to potential buyers. This allows a number of buyers to consider purchase and in this way form a group with increased volume. It is a form of demand-based pricing where prices go down with increased volume of purchase. There is not a reduction in price associated with acquisition uncertainty.

U.S. Pat. No. 6,240,396, issued on May 29, 2001 to Jay Walker et al., describes a system for a buyer to make a guaranteed offer to buy a ticket for a specific price to a plurality of sellers. Any seller can accept or reject the offer. This is a different marketing system from the acquisition uncertainty method in which the buyer agrees to purchase the ticket at a specific reduced price if the supplier makes the ticket available at a designated time near the time of the event; remaining tickets can be sold in this way and are not wasted.

U.S. Pat. No. 6,202,051, issued on Mar. 13, 2001 to Thomas Woolston, describes an auction business method on the Internet. This is an automated mechanism enabling the auction business method. It differs from the acquisition uncertainty method in which the object is specific and the reduced price is associated with the uncertainty the object will be purchasable.

U.S. Pat. No. 5,897,620 issued on Apr. 27, 1999 to Jay Walker et al., describes a method for the sale of an unspecified-time airline ticket representing a purchased seat on a flight to be selected later for a specified itinerary. In this business method there is not a specific ticket being purchased. The buyer knows the day but not how the transportation will occur until near flight time. The cost may or may not be what can be achieved from a system in which excess seating is found to exist. The acquisition uncertainty method is different.

U.S. Pat. No. 5,873,069, issued on Feb. 16, 1999 to Douglas Reuhl et al., describes a system for keeping track of prices on many items, in many stores and markets. The system does not address the problem of what the pricing should be when dealing with perishable goods that can go to waste.

U.S. Pat. No. 5,845,265, issued on Dec. 1, 1998 to Thomas Woolston, describes a method and apparatus for creating a computerized market for used and collectible goods. This is an old market system that is dramatically expanded using new technology. It allows visibility of multiple products to a plurality of customers. It is a different marketing that serves a different need.

U.S. Pat. No. 5,757,917, issued on May 26, 1998 to Marshall Rose et al., describes a computerized system for the payment of the purchase of goods and services. This system can be used by a variety of business methods but in itself is not a method of doing business.

U.S. Pat. No. 5,797,127, issued on Aug. 18, 1998 to Jay Walker et al., describes a system that can be used for using options to purchase airline tickets. One purchases an option to by a specific airline ticket at a specific price, if the option is exercised the ticket price is paid in addition to the price of the option. The benefit to the buyer is that if the trip is not needed only the price of the option is lost.

U.S. Pat. No. 5,404,291, issued on Apr. 4, 1995 to Gordon Kerr et al., describes a process used to maintain inventory control in a hotel reservation system. This type of inventory information can be used in many business situations. It does not provide a method for the hotel and customer to enter an early agreement on a discounted price for either a room or a room upgrade depending on future availability. In the acquisition uncertainty business method the discounted price is awarded at an agreed upon future time if there is availability.

Several Non-United States Patents are reviewed that illustrate different business methods involved in the sale of an object. For example, Requested Patent JP2001014409 issued Jan. 3, 2001 to Akira Kagami et al., describes a system by which knowledge of the ownership of a purchased ticket can be followed even when the ticket is transferred to another person. The system does not assist the method by which tickets are sold or their price. It identifies ownership of a ticket at any specific time.

Requested Patent JP2002074108 issued on Mar. 15, 2002 to Masahide Tsuboi describes a system used in selling a variety of merchandise. The system incorporates a price algorithm based on many factors, which determines the price at any moment. The user then decides to buy or not to buy based on that price. This is a standard market method of purchase with the significant exception that price is continually changing. Everyone will pay a different price. The system requires long periods of attention. It alters the normal sale of items at an established reasonable price.

Requested Patent JP2002117266 issued on Apr. 19, 2002 to Katsunori Tsuji et al., describes a system which maintains information regarding air tickets issued in order to help in making additional reservations. The system is designed to help end users including travel agents make reservations. The information can be accessed by appropriate individuals using a prescribed network.

Requested Patent JP2003150740 issued on May 15, 2003 to Jiro Onoyama describes selling tickets to a performance over a network using information about the performance stored in a data base and purchase by the choice of an auction or by a lottery program. It does not make use of an agreement to purchase in advance at a reduced price if available. It therefore differs from the acquisition uncertainty method.

None of the above patents and the inventions they represent taken by themselves or as a group describe this invention as claimed. Thus the acquisition uncertainty business method and the system that enables it is an invention that will enable perishable object commerce.

BRIEF SUMMARY OF THE INVENTION

In the present invention a buyer who has already purchased or is in the process of purchasing an object such as a product or service enters an advance agreement with the seller to buy an upgrade of that object at a specified price if the upgrade is made available by the seller at a specified time. The buyer may have exact knowledge of the upgrade and its downward-adjusted price; however the buyer is not certain that the upgrade will be available for purchase but knows the specific time this knowledge becomes available. Because of this uncertainty of purchase the offered price is lower than the price at which the upgrade can be regularly purchased. The buyer must have flexibility; in return for the flexibility there is decreased cost. If the buyer requires certainty of purchase then the regular price will be paid in order to have the assurance of acquisition. In the acquisition uncertainty business method the seller is able to attract additional buyers who are committed to buy if upgrades remain after regular sales. This method of sales is especially valuable for a wide range of upgraded products or services which are perishable objects.

There has not been a good model for disposing of remaining upgrades just prior to the end of their finite life without greatly influencing the normal sale of basic products or services. With upgrades, as with most objects of commerce, most times there are additional buyers if they become knowledgeable of an upgrade's lowered cost. The present invention advantageously attracts these buyers and reach a sale agreement when there is only a short period before the upgrade loses all value. The buyer is able to get a lower cost because there is decreased confidence that the buyer will be able to purchase the upgrade. In this method the buyer must have flexibility. The seller is protected from the last minute need to drop the price. The reduced price is one that is discounted to a level that the seller has pre-decided rather than one that is hurriedly and arbitrarily introduced to accommodate over supply. The buyer agrees in advance to purchase the upgrade at the set lower price. The consummation of a sale is delayed until a future designated time at which time the seller will declare how many upgrades are available for sale. If the number of buyers' agreements to purchase is less than the number of available upgrades, all buyers will be satisfied in a purchase. If there is an excess number of possible transactions over upgrades, a selection process can be used to select the actual buyers. A variety of selection procedures, including random, can be employed. Buyers make their agreement to buy during an announced open enrollment period. During that open period they may also cancel their agreement. Once the open period ends the buyers remaining in the program are committed to buy if they are selected. If there are an excess number of buyers to available upgrades, those not selected are not charged. A potential buyer cannot enter the program once the open period is closed. Everyone who enters the program has a chance of being selected. The buyer who enters the program realizes that there is a chance of not being able to purchase the upgrade; there may not be enough upgrades made available and/or there may be an excess number of buyers. This model will encourage an increased pool of buyers who, because of cost, would not consider a purchase at the regular cost. The seller is able to continue normal sales during this program. The seller receives a great deal of private information regarding market characteristics that can help in future pricing and allocation of resources. It encourages use of upgrades and decreases waste.

The present invention provides a method of transacting for a perishable object, an upgrade, whose availability is unknown. This system implements the use of an acquisition uncertainty method. At an early time a buyer agrees to buy an upgrade at a reduced cost if the seller at a designated future time puts the object on sale. The reduced cost to the buyer is associated with the uncertainty that the upgrade will be purchasable. The seller is able to maximize the length of the period before a decision has to be made to sell the object at the reduced cost. The sale is made in an orderly manner that benefits all. The term object refers broadly to items, products, services or anything else that is purchasable. An upgrade is broadly construed to mean any product or service that is held out as being an improved or enhanced over another offered product or service. This system is especially important in the sale of upgrades that abruptly lose value. There is a wide range of upgrades that are perishable objects that include, but are not limited to: upgraded transportation services including seating on an airline, ships, trains, and buses; upgraded theater seats; upgraded event participation; enhanced energy resources; upgraded lodging; upgraded vacation packages, and enhanced human services.

In many business situations there is a time when a product has no further value; the product is perishable. When the flight has left the gate or when the theatrical play has begun the remaining unused "first class" or "box" seats bring no revenue. There are other situations in which there is no final moment but there is still a need to sell an upgraded service or product within certain time frames. An example is the utilization of an orchestra for an event; if an orchestra of up to ten performers is booked for only six performers, and if there are no other bookings, then revenue is lost with respect to the remaining four performers. If they are not working their time is lost. The invention provides the opportunity at the time of booking to upgrade to the full ten performers at a reduced cost, if the additional four performers are available at the specified later time. The present invention achieves this otherwise wasted utilization and revenue in many such situations. It recognizes that there is a cost for the confidence of immediate knowledge of acceptance of purchase and likewise there is a diminished cost if there will be delayed knowledge of acceptance of purchase.

This invention allows a seller and buyer to arrange for the sale of an upgrade, namely an item, product, service or anything else that is purchasable and is an improved or enhanced version of a product, service, or other such object for which a buyer already has, or is in the process of obtaining, a basic version.

The seller establishes:
That offers to purchase an object/upgrade will be accepted;
The downward-adjusted fixed value of the object/upgrade;
The open period of time during which offers are accepted and can be cancelled;
The specific time when a response to accept offers of purchase will be given; and
That there will be a method of selection from among the potential transaction those seeking to purchase.

The buyer agrees:
To purchase a specific upgraded object;
To purchase at the designated price;
To be able to withdraw a potential transaction from the program during the open period;
That there will be a delayed but specific time of confirmation;
To be obligated to purchase if selected; and
That there is no charge if not selected.

The system:
Offers a discounted price to the buyer;
Allows a seller to know that there are buyers for the discounted price;
Does not interfere with sales at the standard price;
Encourages additional buyers who consider the lower price but not the regular price;
Requires buyer flexibility since confirmation of purchase is delayed; and
Utilizes the concept that there is a value which attaches to confidence.

In one embodiment the method is divided into the events that occur in each time period and the periods are temporally sequenced. There are four periods. In the Announcement Period the system is described for potential buyers. This explains how the system in general operates. It then describes the elements of the sale of a specific upgraded object. The Open Period is the time when buyers apply to the program, make the agreement to purchase, submit potential transactions, and are allowed withdraw potential transactions without penalty. The Closed Period is the time in which no further applications or withdrawals are accepted. It is during the Closed Period that the seller makes the decision as to whether any upgrades are to be made available for sale. The buyers potential transactions are then selected from the buyer's pool. At the appropriate time the buyers are notified of the results of the selection process. In the final period the upgrade is used by the acquisition confirmed buyers.

The method of the present invention provides for upgrading perishable objects to a higher level. An upgrade includes any improved or enhanced version of a product or service. In the case where the upgrade is a transportation service such as an airline seat, passengers are informed when they are ticketed that they can enter the upgrade program. In the upgrade program they agree to purchase an upgrade, at a reduced price, if available at flight time. The total charge paid for their ticket and for the upgrade is lower than if they had purchased the upgraded ticket in the first place. There is uncertainty as to whether any upgrades will be available and there is uncertainty of how many passengers will indicate they want to participate. Prior to boarding the number of upgrade seats available will become known to the airline and will be entered into the program. A selection process will be used to choose which passengers will be upgraded. The selected passengers will be notified. This allows the airline to increase its revenue per passenger. It gives a passenger an upgrade at less cost. This can be a significant advantage to a passenger on long flights. The seats vacated by passengers moving to the upgrade can then be used to fill standby requests; seats could also be made available to enrollees in a pool of purchasers transacting for a perishable object.

The invention is a system that enables commerce in perishable upgrades by offering the buyer decreased cost in return for uncertainty associated with acquisition and by offering the seller return on what might otherwise be wasted and lost.

DETAILED DESCRIPTION OF THE INVENTION

A computerized system for transacting for a perishable upgrade, for example through an Internet website via the Internet or other communications linkage, is created for communicating and processing a transaction for a perishable object which is an upgrade. A perishable object is anything which has a time of expiration. An upgrade is an enhanced or improved version of an existing product or service. Upgrades which are perishable objects can include, but are not limited to: seats for airlines, trains, ships, and buses; stadium seats, hotel rooms, tickets to a performance, labor services offering various grades if service, and a whole host of products or services that are subject to unavailability or diminished value at a time of expiration and have a basic or less enhanced variant which is held or reserved by an existing customer.

A buyer purchasing an upgrade for a product or service which has a substantially well defined expiration time pays value for the certainty that the perishable upgrade will be available for his or her use at the time of expiration. Many a price sensitive consumer is willing to forgo the product or service rather than pay that full value. The result is that many perishable objects of commerce expire without ever being purchased. Thus there is a market for existing customers who would purchase the upgrade but for the value paid for the certainty that it will be available at the time of expiration.

The present invention enables the purchase of upgrades by ascertaining and attaching a value to that certainty and adjusting the value of the product or service for purchasers willing to pay the discounted value on the condition that the upgrade may not be available at the time of expiration. Rather than paying the certainty value, the prospective purchaser is given the opportunity to enroll in a pool for the perishable upgrade. At a certain time the perishable is released to the pool of purchasers, who are then selected to purchase the item.

Figure 1:
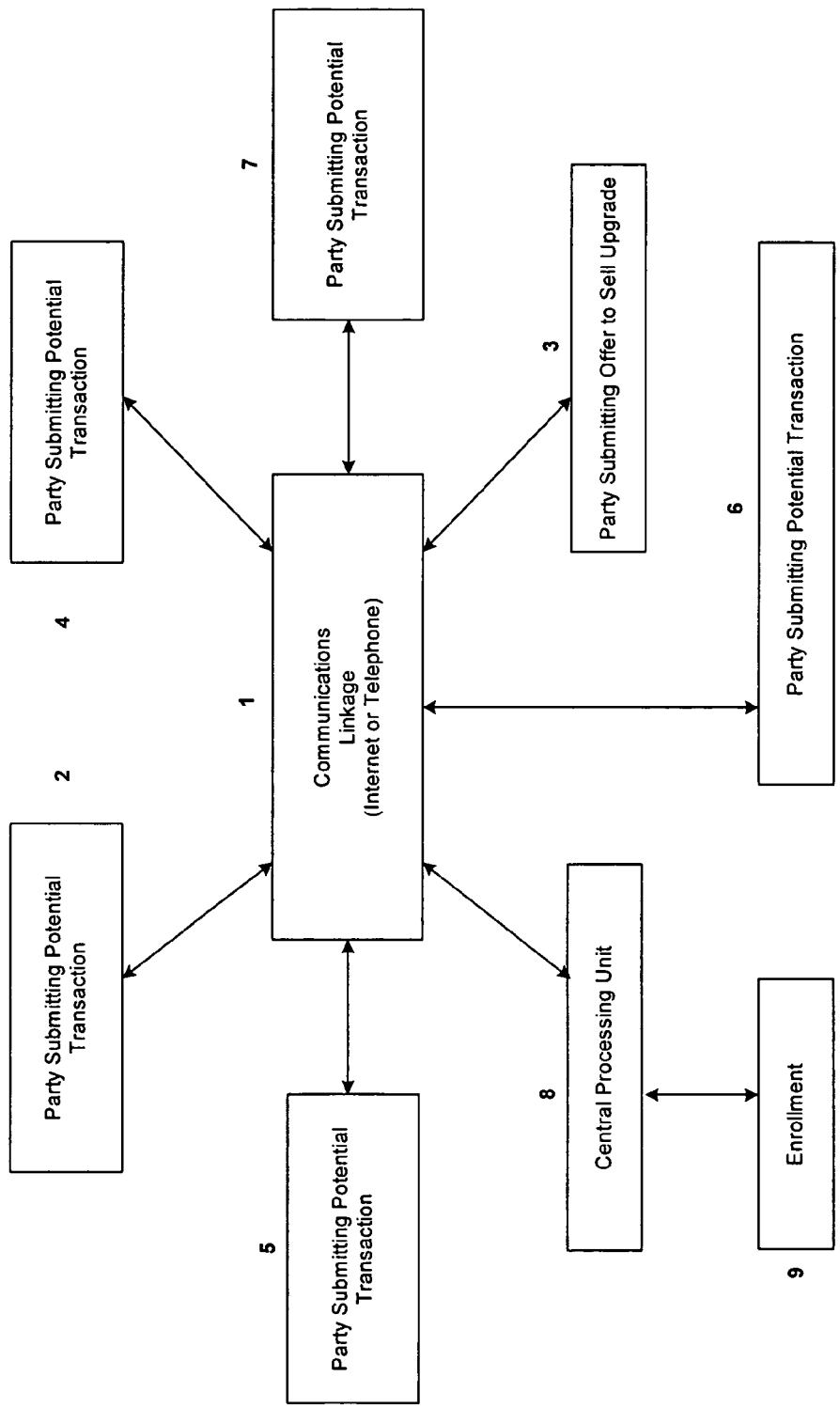
FIG. 1 is an overview of the computerized system usable to implement the present invention.

FIG. 1 shows the basic system using the Internet or a telephone as the communications linkage 1. The system communicates and processes transactions submitted by existing customers 2, 4, 5, 6 and 7 and offers to sell upgraded products or services 3 using at least one central processing unit 8 by accepting and storing potential transactions in an enrollment 9 and selecting actual transactions form the pooled potential transactions in the enrollment 9. The computer system includes operating system software for controlling the central processing unit 8, a way to introduce information into the central processing unit 1, and memory for storing the information 9.

The basic system configuration includes at least one fixed transaction value for any number upgrades. An existing customer submits a potential transaction to a proxy which includes an input, an output and a computer executable program. The program accepts at least one potential transaction via the input into an enrollment pool. The program is structured to close the enrollment by not allowing any potential transactions to be submitted via the input at some time up to the moment of confirmation of the availability of the perishable objects. Once a confirmation indicator indicates that a perishable object is available, the potential transactions in the enrollment pool are selected to be actual transactions for the upgrade.

The system preferably is designed to allow a user to communicate with the system through a standard PC computer and modem via the Internet. The system may also include a voice message system or voice message generator to allow a person communicating with the system to do so through a touch-tone or cell phone linkage or to guide the person in the use of the system. Security is preferably included to make the system inaccessible without entry of the proper information, for example, a transaction identification number identifying the transaction, the perishable object, or the buyer, a security code corresponding to the transaction, and a user security code corresponding to the transaction and identifying the user, the user being the person or representative thereof who is offering to sell or purchase the perishable object if it is available.

The computer can be made secure, for example by the implementation of a "firewall" or protective barrier against unauthorized traffic or the use of encryption technology, and each case can be password protected to assure privacy and prevent unauthorized access. For example, the system may require the user to enter a password or user identification number or alphanumeric combination and a user authorization code providing access control to the system. For increased security, systems may be designed which require user authentication, for example through the use of voice pattern, fingerprints, physical signature, or "smart" card. Advantageously, if the smart card is used, certain embodiments will allow a transaction to be completed by direct transfer of funds onto the seller's smart card.

Still further advantages may be realized when transfer of the transaction value can be automatically, if not immediately, be made to the seller.

Additional advantages may be achieved when documents relating to the transaction are automatically generated by the system for provision to the parties. The documents can be automatedly and immediately transferred to parties to the transaction. For example, if a buyer's transaction for an upgraded airline seat is selected, a ticket for that flight could be automatedly generated and provided to the buyer via a personal computer or a kiosk.

The system preferably also collects and processes transaction data generated from an agreement reached through the operation of the system for dissemination, analysis and use by users of the system or method. For example sellers could be aided in establishing the optimal timing for the confirmation of the availability of upgrades or fixing the value of future transactions. Buyers could determine the likelihood of having their potential transaction selected by looking at the odds and percentages for selection as recorded from previous transactions. Means may be provided for a user to access actual agreements achieved through the use of the system in other transactions, for example, through a menu or voice choice provided to the user via telephone or the Internet whose selection provides the user with information about prior agreements. The data may be tabulated in the memory so as to be accessible by certain categories, for example by sponsor, by geographic location, sales and market data, the type perishable object sold (e.g.; a specific route and schedule for a given flight or bus), or by any other category. In this way, a user of the system can be guided in confirmations of availability or submissions of potential transactions by actual agreements reached in similar transactions.

In an Internet-based embodiment of the present invention, an Internet website is set up to provide the interface between system and user. The major areas of the website can include a login areas for sponsors, buyers or sellers or their respective representatives, as well as a login area for administration personnel who oversee the system. If desired, the website may also include a publicly accessible area that highlights information about the system. For increased security, a separate website may be set up with this information.

Individuals using the computerized system preferably must log into the system before they can manipulate any data. Preferably, they can view, enter and change only that information that is within their access limits—as an agent for party, a directly accessing party, a sponsor user, a sponsor administrator, or a system administrator.

A sponsor user is an agent who works for a sponsor, for example an organization offering perishable objects such as upgrades for sale, which has entered into an agreement to use the computerized system. In the alternative, a sponsor could also host the system, as would be the case where a company which regularly sells its perishable objects online includes a module on a website for the submission of potential transactions for selection if upgrades not sold through its standard sales processes are made available. Preferably a sponsor/seller could host the system by including a module or modules that offer the purchaser of an object an opportunity to enroll for purchase of an upgraded perishable object when he or she purchases the basic version of the object. Hereafter it will be assumed if not otherwise indicated that a sponsor is a selling entity, although this need not be the case as any party can host or otherwise use the present system and method.

The invention implements the acquisition uncertainty method in which a buyer agrees in advance to purchase a perishable object at a future time. The purchase price is adjusted to reflect that there is no guarantee that the upgrade will be available for the buyer to purchase. The upgrade can be unavailable for any number of reasons. It may have been sold through regular business methods, or there may be a large number of buyers who have agreed to purchase and all cannot be satisfied.

In the event there are more potential buyers' transactions for the perishable object, a selection method is employed. Confirmation of purchase is delayed until a designated future time before the expiration of the perishable object. As has been discussed, the purchase price is reduced to reflect the uncertain availability of the object. This system is especially valuable to the seller of an item that loses its complete value at the time of expiration, such as an airline ticket after the plane departs. The seller is able to sell, because of a lower price, additional items that would otherwise go unsold. The normal sales process is not influenced. Marketing information remains confidential with the seller.

Figure 2:
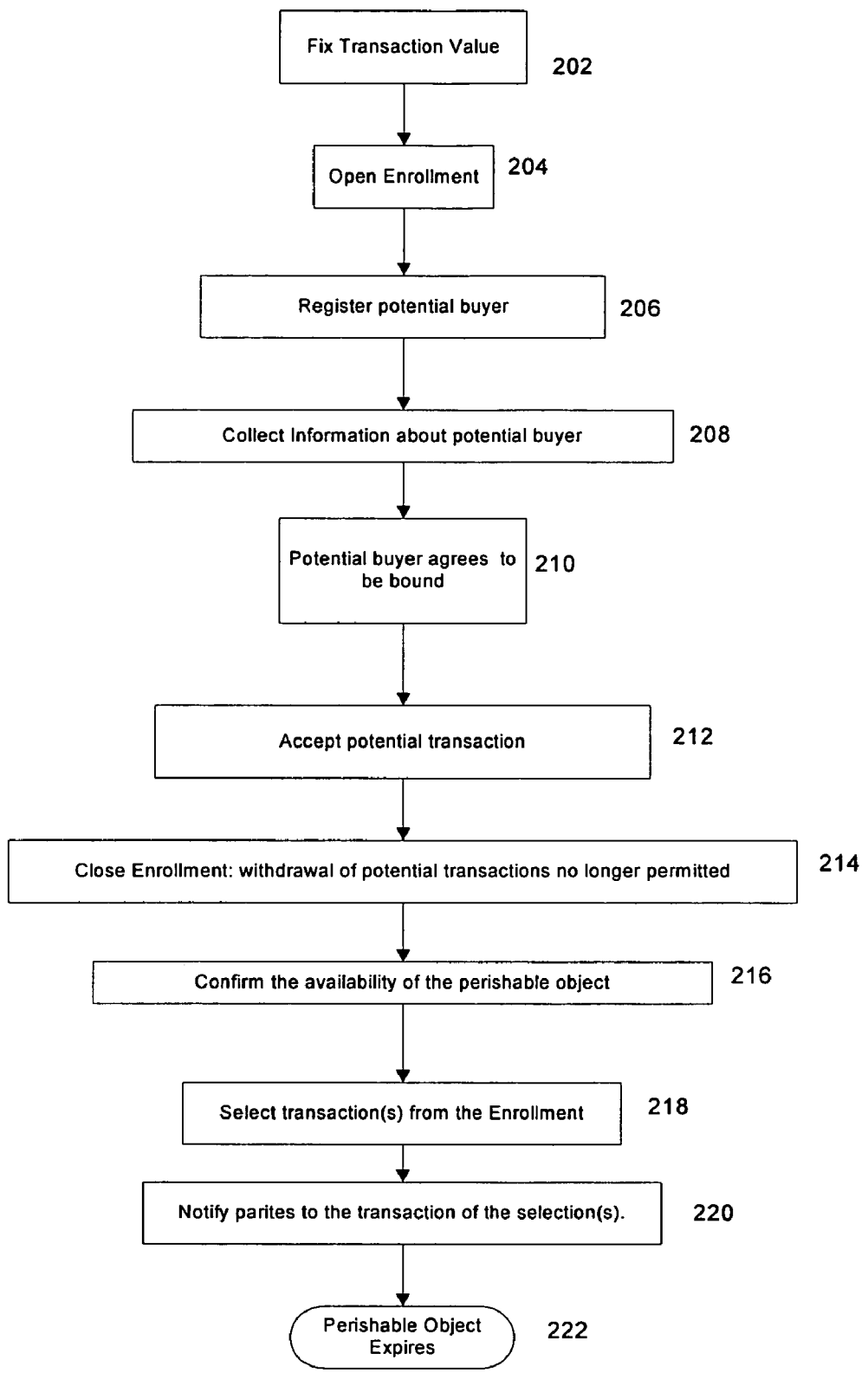
FIG. 2 is a block diagram showing the basic invention as carried out within the system.

FIG. 2 demonstrates the method of the invention as carried out within the system. A party agent or other user (for example a potential buyer of an upgrade or sponsor or seller) accesses the system via the Internet using any standard web browser or via an ordinary touch-tone or cellular telephone. No special equipment or training is needed by the agent to use the system. The system "prompts" the user at each step of the process and provides automated, on demand help if needed. While the present embodiment is shown as one performed on-line, the method of the present invention can be carried out in any number ways. For example, the method could be employed by a representative of a seller offering to enroll a purchaser of the basic object at a live point of purchase of the basic object and the upgrade.

The system receives information from the seller about the upgrade offered including the downward-adjusted cost and the time at which the upgrade loses its value. The adjusted cost is fixed at a value 202 to reflect the fact that the upgrade may not be available to a purchaser choosing to use this method to purchase it.

Opening an enrollment 204 establishes the time frame in which agreements to purchase the upgrade will be accepted, and when they will no longer be accepted. While the enrollment is open, a potential buyer for an upgrade can register in the system 206 and information about the potential buyer is collected 208. Upon accessing the system, the user is met with a greeting followed by a number of options that may be selected by selecting them from a menu presented on a computer screen, or, in a telephone based embodiment, pressing the appropriate number of a touch-tone or cellular telephone. Accessing a computerized system can be accomplished in many ways, for example via Personal Digital Assistants or wireless communication devices; such devices as are well known an constantly improving in the art are contemplated by the present invention. A buyer's pin number or some other identification number, assigned by the system, and two numeric "passwords" are optionally required to commence the submission of a potential transaction. The system generates a confirmation of the information which the user may confirm or cancel and reenter the information. The system may, upon confirmation of the information, determine the correctness of the information and the user's authorization to access the system for that transaction. After entry and confirmation of the required numbers, the buyer follows the prompts and submits information and potential transactions using a mouse or telephone keypad or by typing in the data at his or her personal computer. The system may also request confirmation of information entered.

A party such as a potential buyer agrees that by submitting a potential transaction for an upgrade to the system he or she agrees to be bound 210 to purchase the upgrade if his or her transaction is ultimately selected, thus making it an actual transaction. At this point a potential transaction is accepted into the system 212. The submission and acceptance of a potential transaction can carried out in any manner so long as there is some indicator in the enrollment that a transaction for the upgrade will be consummated upon selection. So, for example, the registration and agreement to be bound could be carried out in one step, and that step could indicate that a potential transaction has been accepted into the system. A potential transaction means that the transaction has the possibility to be an actual transaction—a consummated transaction—for the upgrade by virtue of its selection if the upgrade does indeed become available. Potential buyers are preferably given the option to withdraw a potential transaction from the enrollment while it is open.

Once the enrollment is closed 214, potential buyers can no longer submit potential transactions into the enrollment. The seller preferably gives the time at which it will be known how many upgrades are to be made available for sale.

If, after the confirmation of the availability of the upgrades 216, there are upgrades made available for sale, a selection is made from the enrollment pool for the number of upgrades available 218. Where the objects confirmed to be available outnumber the potential transactions in the enrollment, the selection of actual transactions need not necessarily employ a special selection process since all potential transactions may be selected to be actual transactions. The selection can be random, based on the time in which the buyer submitted his or her potential transaction (e.g. first come, first serve), or based on a pledge to pay an enhanced adjusted fixed cost which ensures priority selection if the upgrade becomes available. The invention may optionally limit the number or percentage of times a specific potential buyer of perishable objects may be permitted to be selected when using the system. All of the parties to the transaction are notified after selection 220. A party to the transaction is broadly construed to include any party interested in the outcome of the selection, and can include non-selected and selected buyers, contemplated users of the upgrade, or sellers. The notification preferably comes a sufficient time before the expiration of the upgrade 222 so that parties to the transaction can arrange their plans in accord with the selection. Where a party knows the time of notification at the time of enrolling, the enrolling party by virtue of this knowledge has already determined that the notification is sufficiently in advance of the time of expiration of the upgrade.

Figure 3:
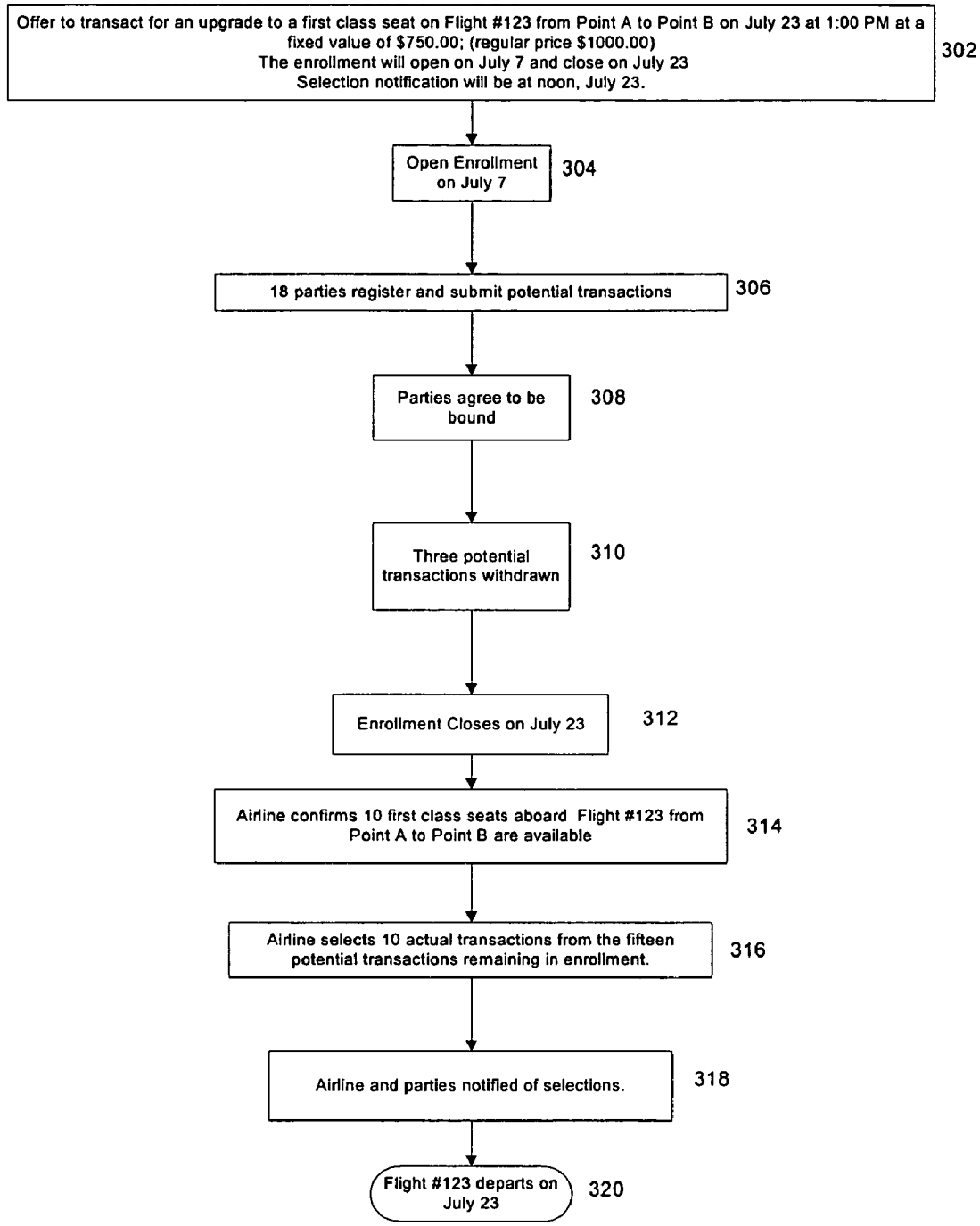
FIG. 3 is a block diagram showing the method as used for the purchase of an upgrade for an airline ticket.

Each step in the system is similar regardless of the item. However, the details of each step are influenced by the nature of the perishable object being purchased. In FIG. 3 the purchase of an upgrade for an airline ticket is used as an example. The system could, however, be carried out for any transportation service, including bus, train or ship.

The sequence of steps preferably includes full knowledge of the perishable object being sold including its regular and its fixed adjusted price or prices. As shown at Step 302 the upgrade is for a first class airline ticket for Flight number 123 leaving at 1:00 PM on July 23. The normal fare is $1000.00 and the discounted fare is $750.00; existing ticket holders can purchase a ticket for a coach class seat for $500.00. The open enrollment period is from 12:01 AM, July 7 until noon of July 23. It is also known that selection notification will be at noon on July 23.

At Step 304 the open enrollment period in which buyers can enter the program is established. A list of buyers and their personal information is made. Each buyer is given an identification number.

During that open enrollment period a buyer can submit as well as withdraw their potential transaction without penalty. Once the enrollment is closed the buyer can no longer cancel the agreement to purchase the upgrade if his or her transaction is selected. If selected, the buyer is responsible for payment. As shown at Step 306 during the open enrollment period, eighteen parties register and submit eighteen potential transactions. Step 308 shows these eighteen parties also make a binding agreement to purchase an upgrade for a ticket on Flight 123 if selected. Since Step 310 takes place prior to the closing of the enrollment, three buyers withdraw their potential transactions, leaving fifteen buyers at the July 23 close of enrollment, shown at Step 312.

Turning to Step 314, at a set time after closure of the enrollment and prior to the item's loss of value at the time of expiration, the seller confirms how many upgrades are available. Following the closure of the enrollment at noon July 23 the airline confirms that there are ten first class seats available on Flight 123.

The method moves to Step 316 where a selection process is used to choose ten actual transactions from the buyers' fifteen potential transactions for the purchase of an upgrade. For Flight 123 ten buyer's potential transactions are selected to buy tickets to be upgraded to first class, thus becoming actual transactions. Five buyers will not be able to buy upgrades as their potential transactions were not selected.

In the case of an upgraded airline seat, the close of enrollment, confirmation, and selection can follow each other in swift, nigh-instantaneous succession. This is useful in that an airline may advantageously wait until a time that is substantially close to the departure of the flight to assure that the highest number of upgraded seats are sold at the normal rate while at the same time capturing the highest number of ticket holders and purchasers from coach and business in the enrollment.

Preferably there is a long enough period of time for a passenger to complete travel plans after the selection announcement is made at Step 318, where the system is used to notify those selected. The identification of the ten passengers is made available at noon July 23. At Step 320 The ticket expires when Flight 123 departs at 1:00 PM July 23. In the case of an airline ticket upgrade to first class, there is ample time to adjust for travel plans even when the notification occurs a mere hour before the flight departs, since enrollees for an upgrade already hold a ticket for coach (or business) class on the same flight; it is unlikely that much extra preparation is necessary to move to first class on the same flight to the same destination. This may not always be the case, such as where the upgrade requires earlier notification to the selected enrollee. For example, an earlier notification time would be preferable if the upgrade was for a theater ticket, and the upgrade included meeting the performers at a reception prior to the performance. In that instance, the notification time would need to account for the earlier reception.

The method implemented by the invention enhances the ability to use resources before their value expires. In this example ten extra first class seats were sold for Flight 123 that otherwise would not have been used.

Figure 4:
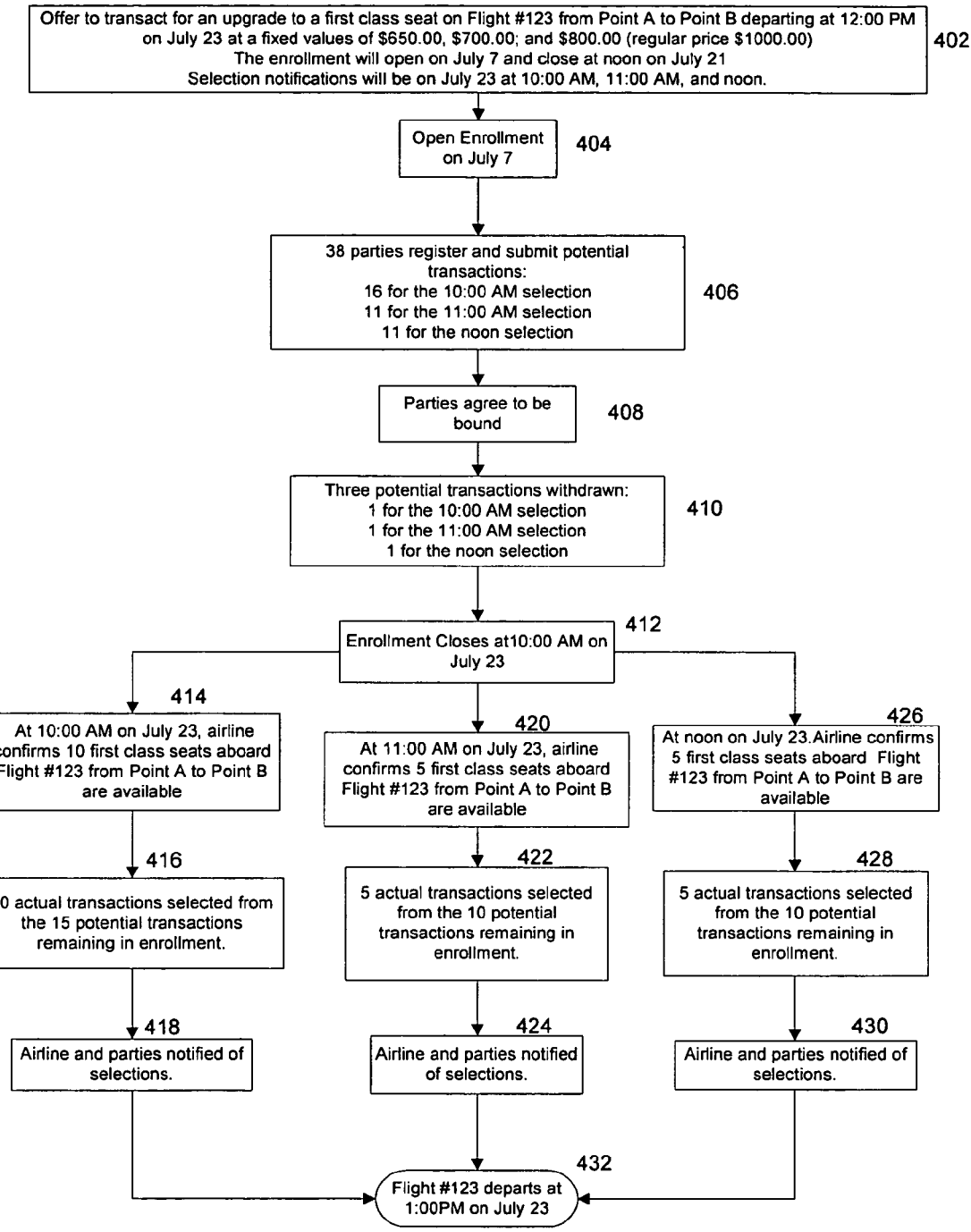
FIG. 4 is a block diagram showing the purchase of an upgrade where the confirmation and selection of the transactions are performed in stages.

FIG. 4 demonstrates the purchase of a perishable object where the confirmation and selection of the transactions are performed in stages. Also shown are the stages as based upon multiple fixed transaction values which are used during enrollment. Again, the purchase of an upgrade for a first class airline seat is used as an example.

As before, the sequence of steps preferably includes full knowledge of the upgrade being sold including its regular and its fixed adjusted prices. As shown at Step 402 the upgrade is a first class airline ticket for Flight number 123 leaving at 1:00 PM on July 23. The normal fare is $1000.00 and there are three fixed transaction values of $650.00, $700.00, and $800.00. The open enrollment period is from 12:01 AM July 7 until 10:00 AM of July 23. It is also known that selection notifications corresponding to the three adjusted fixed values will be: 1) at 10:00 AM on July 23 for those who agree to the $800.00 value (3 hours before flight), 2) at 11:00 AM on July 23 for those who agree to the $700.00 value (2 hours before flight), and 3) at noon on July 23 for those who agree to the $650.00 value (1 hour before flight). The airline could even include a fixed value and notification that occurs at a time substantially instantaneous with the departure time of July 23 at 1:00 PM (not shown).

At Step 404 the open enrollment period in which buyers can enter the program is established. A list of buyers and their personal information is made. Each buyer is given an identification number.

As has been described, during that open enrollment period a buyer can submit as well as withdraw their potential transaction without penalty. Once the enrollment is closed the buyer can no longer cancel the agreement to purchase the upgrade if his or her transaction is selected. If selected, the buyer is responsible for payment. As shown at Step 406 during the open enrollment period, thirty-eight parties registered and submitted thirty-eight potential transactions. Step 408 shows these thirty-eight parties also make a binding agreement to purchase a ticket upgraded to first class on Flight 123 if selected. Since Step 410 takes place prior to the closing of the enrollment, three buyers withdraw their potential transactions, leaving thirty-five potential transactions in the enrollment at the July 23 close of enrollment, shown at Step 412. After the close of enrollment, of the thirty-five potential transactions, fifteen remain for the July 23, 10:00 AM selection, ten remain for the 11:00 AM selection, and ten remain for the noon selection.

Turning to Step 414, at a set time after closure of the enrollment and prior to the item's loss of value at the time of expiration, the seller confirms how many upgrades are available. Following the closure of the enrollment at 10:00 AM on July 23, the airline confirms fifteen first class seats on Flight 123 are available for purchase by enrollees. While more seats on the flight may be open, the airline only releases fifteen.

The method moves to Step 416 where a selection is based upon one of the fixed values. Of the thirty five potential transactions in the enrollment, only the fifteen who submitted a potential transaction corresponding to the $800.00 fixed price are eligible for the 10:00 AM selection. While in the current example the enhanced adjusted fixed value of $800.00 secures priority for selection in the first of three stages of selection, multiple graduating fixed values could also be used to secure priority selection of a potential transaction where the selection was in a single stage. Returning to Step 416, a selection process, preferably random, is used to choose ten actual transactions from the eligible buyers' fifteen potential transactions for purchase. For Flight 123, ten buyer's potential transactions are selected to buy an upgrade, thus becoming actual transactions. Five buyers will not be able to buy tickets at this stage as their potential transactions were not selected. These parties can optionally be given the opportunity to remain in the enrollment and only be obligated to pay the amount corresponding to the stage they are selected in, or to have their obligation to purchase be discharged by virtue of their not having been selected. A non-selected buyer could also given the option to be given priority in the subsequent stage if they paid the enrolled for enhanced fixed price of $800.00. In this example it will hereafter be assumed that non-selected parties are discharged and do not remain in enrollment.

Preferably there is a long enough period of time for a passenger to complete travel plans after the selection announcement is made at Step 418, where a system is used to notify those selected. The identification of the ten passengers is made available at 10:00 AM on July 23. As has been discussed, in the case of an airline ticket upgrade to first class, there is ample time to adjust for travel plans even when the notification occurs a mere hour before the flight departs, since enrollees for an upgrade already hold a ticket for coach (or business) class on the same flight; it is unlikely that much extra preparation is necessary to move to first class on the same flight to the same destination. It should be noted that the notification occurs, as is an option, substantially instantaneously with the closing of enrollment and the selection of the actual transactions. This can occur for any number of reasons. In a fully automated system a computer program can be configured—with modules for example—to close the enrollment, confirm or accept the confirmation of perishable objects, select actual transactions, and send notifications all at once. It is also possible for the confirmation to precede the closing of enrollment, or in some instances, be the condition for the closing of enrollment. It is also possible to foreclose the withdrawal of potential transactions prior to the close of enrollment, in which case any party submitting a potential transaction after the foreclosure period would not be given the opportunity to withdraw.

Step 420 a second stage, at a set time after closure of the enrollment and two hours prior to the item's loss of value at the time of expiration, the seller confirms how many upgrades are available. Again, following the closure of the enrollment at 10:00 AM on July 23, at 11:00 AM the airline confirms five more first class seats on Flight 123 are available for purchase by enrollees. While more seats on the flight may be open, the airline only releases five more.

A selection is based upon another of the fixed values at Step 420. Of the twenty potential transactions remaining the enrollment, in this stage it is only the ten who submitted a potential transaction corresponding to the $700.00 fixed price who are eligible for the 11:00 AM selection. At Step 422 a selection process, preferably random, is used to choose five actual transactions for Flight 123 from the ten potential transactions based on the $700.00 fixed value. An announcement is made at Step 424 to notify those selected as well as all other interested parties.

The third stage of confirmation and selection is disclosed at Steps 426 to 430. A set time after closure of the enrollment and one hour prior to the item's loss of value at the time of expiration, the airline confirms how many perishable objects are available, as shown at Step 426. Again, following the closure of the enrollment at 10:00 AM on July 23, on July 23 at noon—an hour before the scheduled takeoff of Flight 123—the airline confirms five more first class seats on Flight 123 are available for purchase by the reaming ten enrollees with pending potential transactions.

A selection is based upon another of the fixed values at Step 428. The ten enrollees who submitted a potential transaction corresponding to the $650.00 fixed price remain for the July noon selection. At Step 428 a selection process, again, preferably random, is used to choose five actual transactions for Flight 123 from the ten potential transactions based on the $650.00 fixed value. Had the example been used where a non-selected buyer from one of the earlier stages remained in the enrollment, rather than using a wholly random selection the non-selected buyer could have been given the option to be given priority in the subsequent stages if they paid the enrolled for enhanced fixed price. An announcement is made at Step 430 to notify those selected as well as all other interested parties. At Step 432 The ticket expires when Flight 123 departs on July 23.

The method implemented by the invention enhances the ability to use resources before their value expires. In this example thirty-five extra first class seats were sold for Flight 123 that otherwise would not have been used. Furthermore, the method is able to achieve finer valuation for differing levels of comfort that a given buyer has with the risk of uncertainty.

A computer-automated system is capable enabling this method of the present invention. It has a number of interacting components. The components are in part dependent on the nature of the object being sold.

The system has several databases including:
Object or Upgrade description
Schedules (flights, performances etc)
Buyer's background and financial information
Buyer unique identification numbers
Agreement confirmation numbers
Buyers enrolled for a specific program
Buyers removed from a specific program
Potential Transaction unique identification numbers
Potential Transactions enrolled for a specific program
Potential Transactions removed from a specific program
Removal confirmation numbers
Potential transactions selected for a specific program
The system has the capability of:
Menu interaction
Displaying a description of the method
Securing object identification and open period details from seller
Securing buyer background and financial information
Securing advance agreements of participation
Securing buyer information who wish removal of themselves or transactions from the program
Securing the number of available objects from seller
Generating random numbers for buyer selection if random selection
Matching selected number rank with individual buyers
Generating the selected buyers
Notification of selected buyers
Accounting program
Generation and preparation of reports.
Setting an indicator thereby indicating the enrollment is closed.
Setting a confirmation indicator thereby indicating the confirmation of the availability perishable objects.

Setting a selection initiation indicator thereby automatically initiating a payment from the entity.

The system is adaptable to many modes of communication, including the World Wide Web network.

The computerized transacting for perishable objects which are upgrades may be implemented in Internet-based embodiments using a computer program representing a distributed database application written in a Mark-up Language such as ColdFusion Markup Language and HyperText Markup Language (HTML). The system can be distributed through ColdFusion Server extensions which allow for interactive processing and Microsoft's SQLserver to allow agents and loan officers to access it via a standard web browser such as versions 3.0 and up of Microsoft Internet Explorer and Netscape Navigator, which can be found on a variety of platforms, including Microsoft Windows, Macintosh, and UNIX-type operating systems.

Information entered for a transaction is submitted to a central database via the Internet. The database can index buyers, sellers, sponsors, sponsor users and administrators associated with that sponsor, and transactions and upgrades associated with that sponsor or seller. It also can index buyers associated with transactions. This information can be maintained in a detail log accessible by any entity so authorized.

If a period of time passes without activity when a user is online, for example 20 minutes under normal network traffic conditions, the user is automatically logged out for security precautions. For all or a portion of the data, the system may be designed so that once data has been entered, a user has a period of time, for example 30 minutes, during which it can be modified or withdrawn but after which the data cannot be withdrawn. Similarly the program can be designed to foreclose modification or withdrawal of potential transactions by establishing a time period for the enrollment, after the close of which date representative or the potential transaction cannot be withdrawn.

Figure 5:
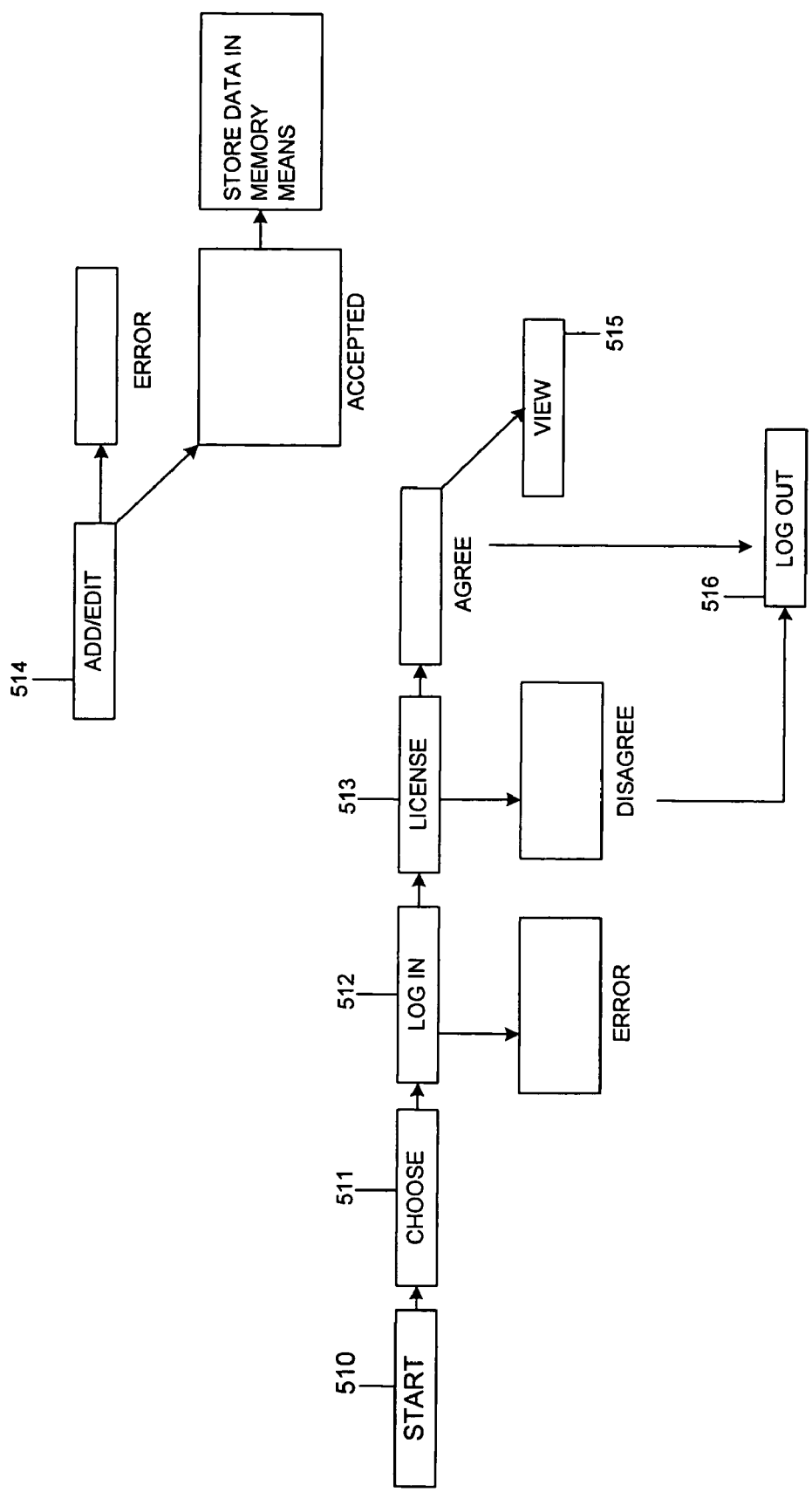
FIG. 5 is a diagram showing the program flow from a user perspective in accordance with a method for operating the system of the present invention via the Internet.

Referring now to the flow chart of FIG. 5, the computer program implementing the system enters at Step 510 when a user opens their web browser (for example Netscape or Microsoft Internet Explorer 3.x or 4.x) and accesses the system website. The user is prompted by a menu with a series of options, one of which is "enter as Sponsor" which is chosen. If desired, the system may automatically write information in the form of ASCII text or "cookies" onto the user's hard drive as a means of keeping track of the user and the user's use of the system. The memory stores this information. Upon access to the system by the user, any preexisting cookies of the user may be modified to reflect the current access of the system by the user. Unless the user has explicitly denied cookies on his or her browser, the computerized system checks for the user's name through a variable saved in the user's browser. If the user has logged in before, the user is greeted by username, provided the user is logging in with the same computer. In Step 511, the sponsor user is presented with the choice of adding/editing transactions, viewing all transactions for that sponsor, or logout. All or a portion of the data in the system may not be withdrawn after a period of time in which event the user will no longer be permitted to modify that information. A menu can be provided in which the user may choose one of two links to separate functions. For example, a menu bar may be provided on the left hand side of the screen in which the user chooses by clicking on the appropriate box in the menu bar corresponding to the function. The user's choice is saved through intermediate login and contract screens which follow. Alternatively, Step 511 may be implemented following login (Step 512) discussed below.

The program next moves to Step 512 in which the user must first log into the system before editing or viewing transactions. The user must enter a username and a corresponding password. If these do not match the pairs known by the system, the user is shown an error screen with the option to try again.

Alternately, if the user has logged in before with the same computer, his or her username may already be entered into the system, and the server which distributes the web pages checks the user's password against the username. If desired, the system may be designed so that the user has the option to enter a new or different username to allow multiple users to access the system from the same computer.

Computer program modules can be written to implement the various steps of the process, including fixing the value, opening and closing the enrollment, confirmation of the availability of upgrades, and selection of potential transactions. For example, a module controlling the buyer user identity process may be created to hold all variables related to a seller or buyer user's identity and to transactions of that seller or buyer.

A "ValidateNewUserName" module may be created which is called when the user places an entry in the user name field and leaves the field form. The user name entry form may be a JavaScript object which checks to see if the username has already been taken, and if so, displays an error message.

Step 513 shows the user a system participation agreement if the correct name and password were entered. The agreement details the terms of use of the system and details regarding the process, which would include an agreement to purchase or sell the upgrade if a potential transaction is selected. A button may be provided on the menu for either agreement or disagreement with the contract. If the user agrees to the terms of the contract, he or she proceeds to the original menu choice (enter upgrade, adding/editing transactions, or viewing transactions). Otherwise, the user is returned to the login screen with all information cleared.

If the user agrees to the participation agreement, the system may send the user to the original menu choice in Step 511. Alternatively, the system may be designed to send the user to a menu with the options of assigning a new upgrade, reviewing transactions, adding/editing transactions or logging out.

If the adding/editing transactions (or Upgrade) choice was originally chosen, the program enters Step 514 where an Add/Edit transaction screen allows the sponsor to enter the following information into the database:

Party name
Transaction (or Perishable Object/Upgrade) Description
Transaction Value
Transaction (or Party) ID
The Party address, city, state, zip code,
telephone, fax, and email
credit card name, number, expiration In telephone-based or live point of service embodiments, some or all of this information may be entered with the assistance of system administrators.

The ID is a number can be used for many purposes, such as sponsor internal tracking, which is selected by a seller, a system program, or any other party.

The screen also may display the status of the transaction. Upon submitting the information, the user may be returned a confirmation screen with all entered information upon which the user can choose to accept the changes or return to edit the transaction further. The system provides the user with a period of time, for example, thirty minutes, to edit some or all of the transaction information before that information becomes final. (Similarly in the case of a buyer, the program can be designed to foreclose modification or withdrawal of potential transactions by establishing a time period for the enrollment, after the close of which date representative or the potential transaction cannot be withdrawn, or simply foreclosing withdrawal of any transactions after a certain time.)

An Add/Edit screen can include a "submit" button at the bottom, which sends the information to be checked for formatting. It points out missing or improperly formatted text, or returns the text for verification. If the text is accepted, the data is sent to the database for entry as an addition or update. (Similarly in the case of a buyer, the program can be designed to foreclose modification or withdrawal of potential transactions by establishing a time period for the enrollment, after the close of which date representative or the potential transaction cannot be withdrawn, or simply foreclosing withdrawal of any transactions after a certain time.)

A "TransactionDataEntry" module may be created to hold a template that processes the user's entry of transaction data and add/insert it into the database.

If the original choice was viewing all transactions, the program moves to Step 515 where the View transactions screen reveals all the information for a given transaction which has previously been entered during an Add/Edit choice. The user is also given an option to edit the information with a specified time limit (e.g. 30 minutes). The View screen may, if desired, also display a list of transactions that have been assigned to a sponsor user.

A module called "SellerUserShow" contains a template which shows the user these records. If the sponsor or seller user has administrator privileges, the module shows all user records related to the seller/sponsor user. A similar module called "SellerShowTransactions" functions to show transaction information.

In Step 516, the user may log out of the system from a menu choice to end the session and return the user to the login screen. This menu choice also follows completion of the Add/Edit and View choices of Steps 514 and 515. If a user attempts to engage the system again, he or she will have to login their user name/password pair. Logging out clears the password, but not the user name, so that upon subsequent login the computerized system may check for the user's name in the user's cookie if the user accesses the system with the same computer.

The screens appearing in the operation of the system may be created by suitable computer programs written in a Standard Generalized Mark-up Language such as ColdFusion Script.

The computer program code for the Login screen creates the login form if a user is determined not to be in a logged in state (Step 512). This form passes on a variable value indicating the user's eventual destination.

The module for the License screen follows the Login program and checks the user's authentication credentials. If the user passes, the License screen is shown (Step 513). A module called Login results follows the License module and sets the user state to logged in. Unless the user has explicitly denied cookies on his or her browser, the program also checks to see if the user's cookie has taken correctly and sends an error message if it does not. If all is correct, the module sends the user on to his or her selected destination.

A Logout module may be used to log a user out of the system. The next time the user tries to use a menu item, he or she will be prompted for a password and to approve the license agreement.

If the user disagrees with the license, a module following the License module displays the Disagree screen which indicates that the user must agree to the license in order to use the system.

An Access Denied screen may be created to show a user who attempts to access a section he or she does not have authorization for.

A Default page for debugging purposes may also be used to show current user login status. This page is for a system administrator, and other users would normally not be able to access this page without mentioning it explicitly.

The above-described steps can apply equally to sponsor (or seller) administrators users designated with administrator privileges by the sponsor). However, the system may be designed so that if the user is identified as holding administrator privileges, he or she will see an enhanced version of the sponsor user menu. In addition to providing the user with the option to assign a new transaction or upgrade, review transactions, assign transaction values, and logout, the sponsor administrator menu provides the options to change sponsor information, change his or her own user information, add a user, show/edit users, and remove a user.

If the change sponsor information option is selected, the program sends the user to change the sponsor information screen which allows the user to add/edit sponsor information stored in the database, including:
   Sponsor Name
   Address
   City
   State
   Zip Code
   Phone
   Fax
   Email If the remove a user option is selected, the program sends the user to user information screens which the sponsor user administrator can use to change, delete, or add information to any sponsor user's record to which they have access for their sponsor. For example, the user information screen may allow the user to add/edit the following information into the database:
   User Name
   Sponsor Name
   Address
   City
   State
   Zip Code
   Telephone
   Fax
   Email
   Username
   Password
   Active User (yes or no)
   Administrator User (yes or no)

Computer modules contain the screen forms for entering and editing sponsor user and new sponsor user information. These modules also may screen users for administrator privileges, for example, before allowing the user to edit records. Where a sponsor engages in the regular online sales of its own perishable product or service, the present system can be implemented as modules with cooperatively work within the systems already existing architecture for the entry of data to consummate its regular sales.

Many of the above-described steps also apply to a buyer or buyer agent, i.e. an agent that represents an individual or company that wants to submit a potential transaction or has initiated a potential transaction with a sponsor who has entered into a participation agreement to use the system.

The buyer may be notified, for example, by regular mail, that he or she can login to the website and submit a potential transaction. In a similar manner, a party may contact the system to submit a potential transaction. The party may be required to digitally sign or otherwise acknowledge being bound in accordance with the participation agreement, and in some transactions tender some form of payment, to engage the system.

As in the case of sponsor users, the buyer opens his or her web browser and accesses the system website Step 510. The buyer, however, chooses an "enter as buyer" option provided on the menu that appears.

In Step 511, buyer is presented with the choice of reviewing potential transactions. A menu can be provided in which the user may choose one of three links to separate functions via a menu bar on the left-hand side of the screen. As in the transaction of the sponsor user, the buyer choice is saved through intermediate login and contract screens which follow.

The program next moves to Step 512 in which the user must first log into the system before submitting potential transactions or viewing transactions. A "Login" computer file for an agent similar to the "Login" file for the sponsor implements this step. The user must enter a transaction identification number, a security code, for example, an internally generated random number which functions as a password), and buyer security code (preferably, a code generated by the sponsor). If these do not match the information known by the database, the user is shown an error screen with the option to try again.

As in the transaction with the sponsor user, Step 513 shows the party agent a system participation agreement if the correct name and password were entered with the same options and results discussed previously. A "License" file similar to the "License" file for the sponsor user implements this step.

If the user agrees to the terms of the agreement, he or she proceeds to the original menu choices. Alternately, the system may be designed to send the user to a main menu with the options of obtaining transaction information or submitting a potential transaction for the upgrade. A "Login-Results" file and a "Disagree" file similar to corresponding files for the sponsor-user follow the "License" file to implement this step depending on whether the party agent agrees or disagrees. Similarly, "Logout", "Access-Denied", and "Default" files corresponding to similar files for sponsor users are provided.

If the transaction information option was selected, a transaction information screen is provided which allows the buyer to view the following information from the database:
   Transaction or Perishable Object/Upgrade Name
   Status
   Seller Name
   Buyer name
   Buyer address
   Buyer city
   Buyer state
   Buyer zip
   Buyer telephone
   Buyer fax
   Buyer email The screen displays the current status of the transaction with the corresponding details of the transaction without the ability of the agent to edit any of this information. A module controlling the transaction status process may be written to hold all variables related to an buyer's transactions.

A "BuyerTransactionInfo" module may also be created which displays the information an buyer needs to start submitting transactions. A "SubmitTransaction" module may be created to allow a buyer to submit potential transactions. This information can be withdrawn until the a time for submitting transactions passes, at which point the potential transaction stays in the enrollment until such time as there is a selection of an actual transaction. Once the submission time passes, the system forecloses the submission of potential transactions after that time. Once the enrollment is closed, the buyer will see a message that the time for submitting a transaction for the upgrade is now closed in the system.

A sponsor or seller, upon determining if an upgrade is available, releases the object to the system. Computer modules for the entry of this information can be created. A computer program could also be used to detect and release unsold or otherwise available upgrades at predetermined times, the regular sales of which can be tracked by the program. Upgrades can thus be confirmed to be available to the enrolled potential transactions. At this point the system can select potential transactions from the enrollment pool to be actual transactions for the confirmed upgrades. The system can use programmed algorithms or tracking to select potential transactions, for example a random selection algorithm, a program which tracks the sequence or the agreed price for which potential transactions were submitted, or combinations thereof.

Figure 6:
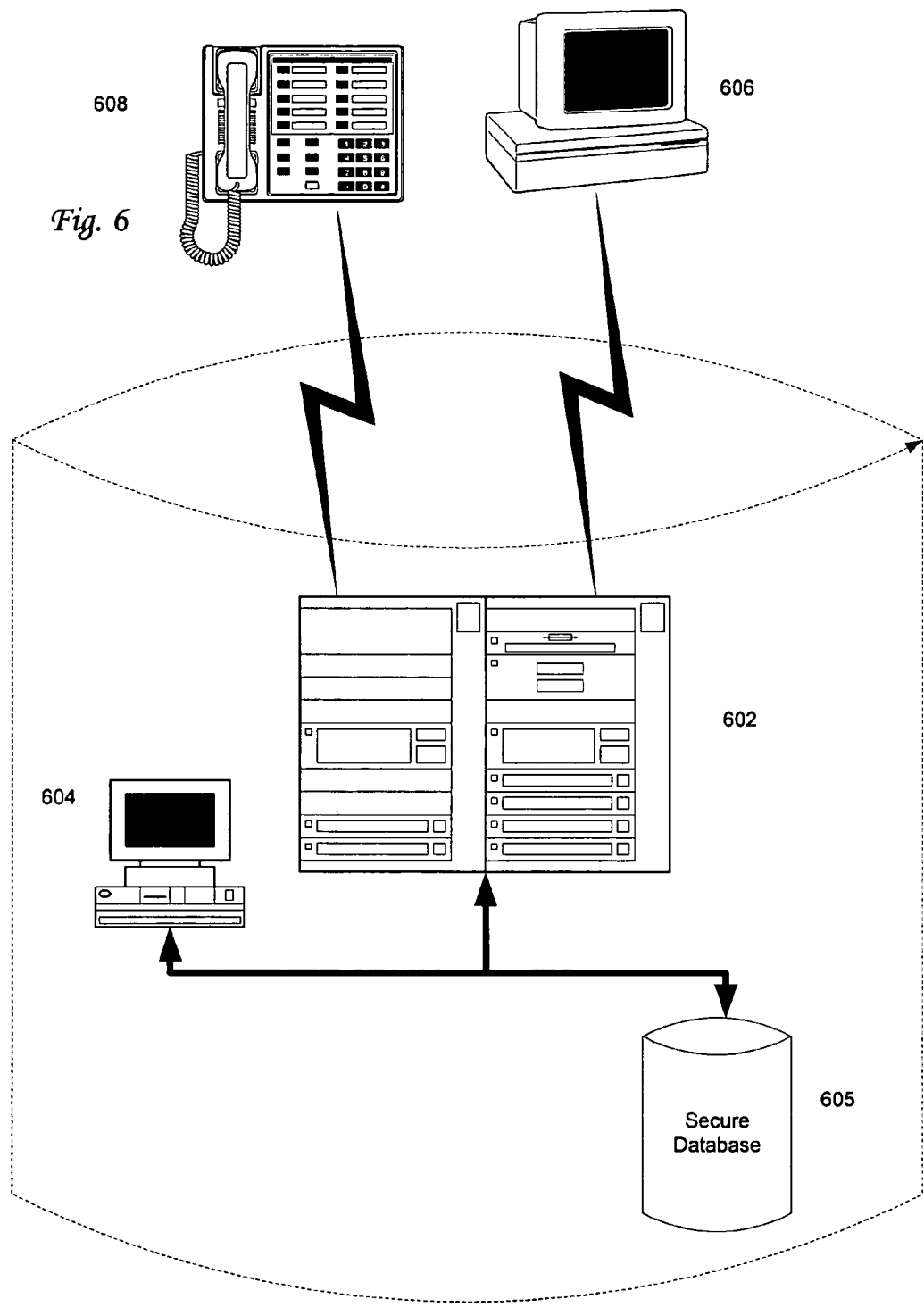
FIG. 6 is an overview of the computerized system.

If the user is presented with the transaction acceptance screen, the transaction is completed and the buyer is notified of the dollar amount of the agreement, and, if necessary, the details of where to send the final agreement request (e.g., the sponsor's address). Parties can also be notified of other information pertinent to the transaction, for example, shipping information for a product sold in the transaction. As shown in FIG. 6, the system can be designed so that upon completion of the transaction, data for the agreement is collected and stored for access and use by sponsors and parties in establishing the bargained value in future transactions.

The selected platform and hardware to implement the system should be scalable enough to handle large loads of traffic and data, while being responsive to user requests.

Similarly, the database chosen should be scalable enough to handle a distributed data environment, and to be able to handle large loads of data, while being responsive to user requests.

The application server likewise should be scalable enough to handle a distributed data environment, and to be able to handle large loads of data, while being responsive to user requests. The application server is a popular platform in which to build applications of this type in order to support future changes, add-one, modifications, etc.

The server can be an open architecture computer that has the ability for failed hardware parts to be replaced swiftly. This configuration also maintains the availability to increase the power of the machine or counter-offer. For example, a computer having an Internal Pentium 400 MHz Processor, with 128 MB SDRAI4, a pair of multi-Giga Byte Hard Drives, a Promise PCIRAID Level 0 Controller or a RAID Level 5 Controller, a 32×CD-ROM, and 3-COM 10-BaseT Ethernet Card is suitable for use in the system.

The platform for use in the system has the ability to work with open database systems, provide a reliable and scalable platform for Internet and line of business applications, and offer breed file and print services that give users easy and effective access to information and resources. For example, Microsoft Windows NT Server 4.0, or 4.0 (Enterprise Edition) system, a powerful multipurpose server operating system, is a suitable platform because of its broad support of many application servers, its scalability to support the system of the present invention and its popularity with developers who create applications of this type. The platform integrates the following services into underlying operating system infrastructure:

Built-in networking and communication services
Comprehensive Web services for the Internet and corporate intranets
Complete platform form for distributed applications
Enterprise-wide directory services
Integrated and robust security services
Easy-to-use and flexible management services.

The system of the present invention uses a webserver, such as Microsoft Internet Information Server 4.0, that offers proven scalability and tight integration with the operating system and other products used in the system. The web server includes publishing features, customizable tools, and technologies that permit the creation of Web pages, the publication of information to the World Wide Web, the sharing of files and data on operating systems such as Windows NT, Novell NetWare and UNIX servers, and over numerous databases, including Microsoft SQL Server, oracle, and Sybase databases, and the search capacity for content in HyperText Markup Language and Microsoft office document types, and multiple languages.

The webserver offers process isolation, a feature which protects applications and Web sites from failure caused by misbehaving components or Web-applications on the server by running them in separate memory spaces. The webserver should also have, when combined with the operating system, built-in distributed application services that automatically scale to serve thousands of simultaneous users.

A high performance, open architecture, scalable database, such as Microsoft SQL Server 6.5 or 7.0, may be used in the system.

In one arrangement, the computer program is one which provides a scalable platform to deliver high performance Web applications with any major Web server on Windows or Solaris. Allaire ColdFusion Application Server 3.1 and its cooperating ColdFusion Markup Language are suitable for use in developing the system.

In another arrangement, the computer program is one which provides a scalable three-tiered platform to deliver high performance Web applications with any major Web server on Windows or Solaris. The front end is ASP/HTML, the middle tier is Com Object written in C++ or JAVA, and the back end is SQL Server and MTS.

The system may be hosted at a quality data center, such as a worldwide data center company which provides access to the Internet and monitors the servers to ensure that they are responding to Internet requests.

Figure 7:
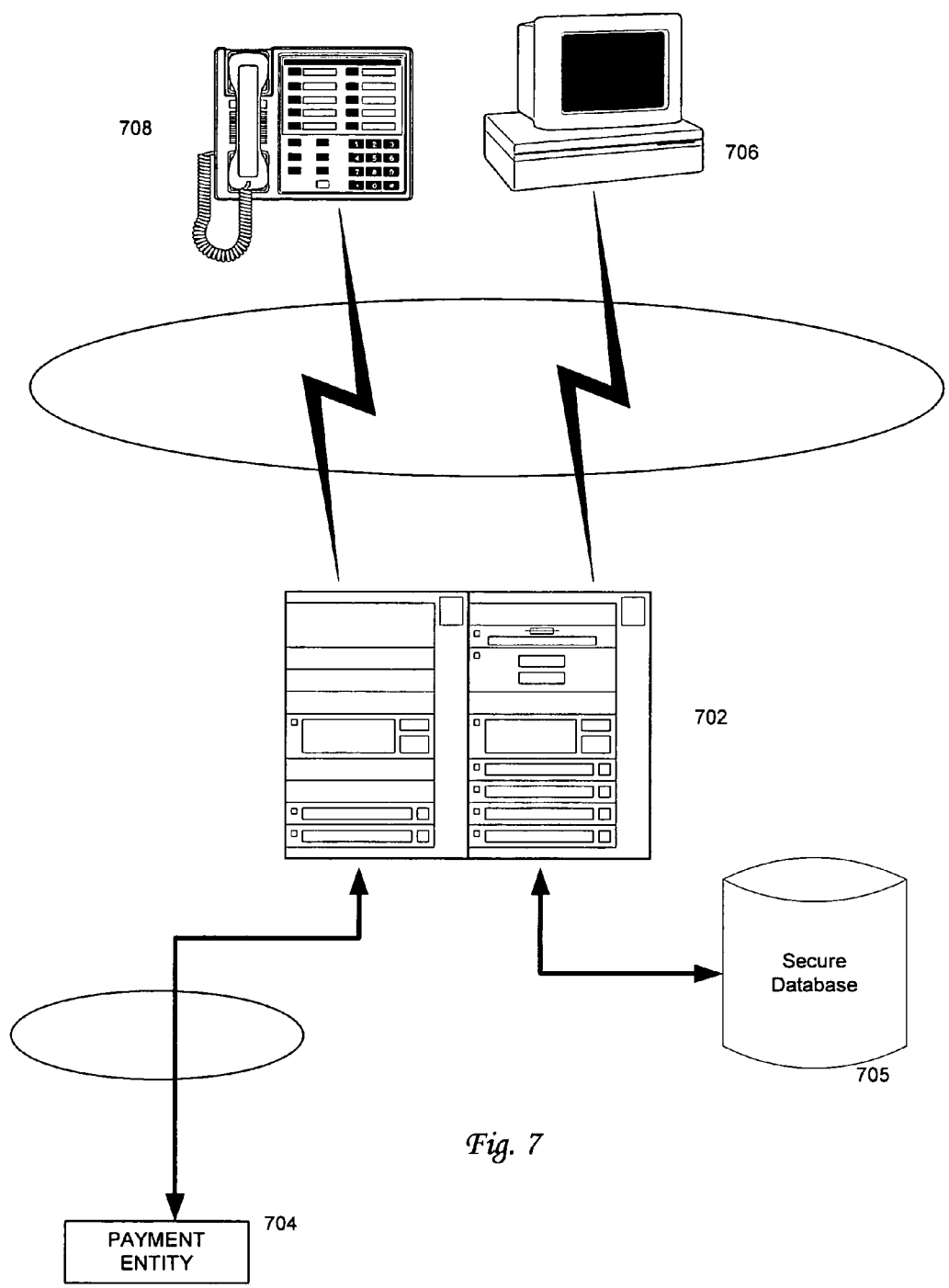
FIG. 7 is an overview of the computerized system including the direct payment interface option.

A further advantage flowing, in part, from the on-line nature of the system is the ability to automatically provide immediate payment to a seller or initiate an immediate transfer of the payment or value when an agreement is reached. The system FIG. 7 is a simplified system variant which includes an interface 702 to effectuate payment to the seller automatically. For example, the interface 702 may be to a payment card account system such that if an agreement is reached, and the seller is a registered cardholder the seller's credit/debit/charge/entertainment card is automatically credited with the agreement amount. Similarly, if the seller has a smart card, stored value card, online creditable purse or module, or other on-line accessible way for the recipient to automatically (and directly) receive the transfer, the system may be configured to automatically credit it with the agreement amount. Given the numerous ways known to transfer or receive value on-line and the rate of growth in new ways to do so, it will be appreciated that the basic principle is the automatic provision or transfer of value, not the particular scrip, protocol or device used to do so.

Alternatively, the seller may provide the system with an account number into which a wire transfer of the funds may be automatically transferred.

As discussed, additional advantages may be achieved when documents relating to the transaction are automatically generated by the system for provision to the parties. The documents can also be automatedly and immediately transferred to parties to the transaction. For example, if buyer's transaction for an airline flight is selected, a ticket for that flight could be automatedly generated and provided to the buyer via a personal computer or a kiosk.

Although the present invention has been described in relation to particular preferred embodiments thereof, many variations and modifications and other uses may be made without departing from the invention. Accordingly, it is intended that all such alterations and modifications be included within the spirit and scope of the invention as defined in the appended claims.

What is claimed is:

1. A computer implemented method for offering an upgrade, comprising:
   (a) utilizing a computer to electronically receive from a first buyer information related to a purchase of a first object and to store the received information from the first buyer in a database;
   (b) utilizing a computer to electronically receive from a second buyer information related to a purchase of a second object and to store the received information from the second buyer in a database;
   (c) utilizing a computer to electronically offer to the first buyer an opportunity to engage in a transaction with a seller for an upgrade to the first object at a non-zero monetary discounted upgrade price and to store the offer to the first buyer in a database, wherein a time that the offer is made to the first buyer is before a time when the transaction associated with the first buyer for the upgrade to the first object would be carried out;
   (d) utilizing a computer to electronically offer to the second buyer an opportunity to engage in a transaction with the seller for an upgrade to the second object at a non-zero monetary discounted upgrade price and to store the offer to the second buyer in a database, wherein a time that the offer is made to the second buyer is before a time when the transaction associated with the second buyer for the upgrade to the second object would be carried out;
   (e) utilizing a computer to electronically receive an acceptance by the first buyer, at a time after the making of the offer to the first buyer, of the offer of the opportunity to engage in the transaction associated with the first buyer and to store the acceptance by the first buyer in a database, wherein the acceptance of the offer by the first buyer obligates the first buyer to purchase the upgrade if made available to the first buyer but does not obligate the seller of the upgrade to sell the upgrade to the first buyer such that the commitment of the first buyer to purchase the upgrade is made before it is known whether the seller will make the upgrade available for sale to the first buyer;
   (f) utilizing a computer to electronically receive an acceptance by the second buyer, at a time after the making of the offer to the second buyer, of the offer of the opportunity to engage in the transaction associated with the second buyer and to store the acceptance by the second buyer in a database, wherein the acceptance of the offer by the second buyer obligates the second buyer to purchase the upgrade if made available to the second buyer but does not obligate the seller of the upgrade to sell the upgrade to the second buyer such that the commitment of the second buyer to purchase the upgrade is made before it is known whether the seller will make the upgrade available for sale to the second buyer;
   (g) utilizing a computer to electronically transact, at the option of the seller and at a time after acceptance by the first buyer of the offer, a purchase of the upgrade by the first buyer at the non-zero monetary discounted upgrade price associated therewith; and
   (h) not transacting, at the option of the seller, a purchase of the upgrade by the second buyer at the non-zero monetary discounted upgrade price associated therewith.

2. The method of claim 1, wherein each of the first object and the second object is selected from the group consisting of: (a) a product; and (b) a service.

3. The method of claim 2, wherein the service is selected from the group consisting of: (a) a transportation service; and (b) a lodging service.

4. The method of claim 3, wherein the transportation service is selected from the group consisting of: (a) an airline service; (b) a bus service; (c) a rail service; and (d) a ship service.

5. The method of claim 3, wherein the lodging service is for a hotel room.

6. The method of claim 1, wherein the information received from the first buyer relates to a purchase being made.

7. The method of claim 1, wherein the information received from the first buyer relates to a purchase which had already been made.

8. The method of claim 1, wherein the information received from the second buyer relates to a purchase being made.

9. The method of claim 1, wherein the information received from the second buyer relates to a purchase which had already been made.

10. The method of claim 1, wherein the upgrade to the first object is an enhanced version of the first object.

11. The method of claim 1, wherein the upgrade to the second object is an enhanced version of the second object.

12. The method of claim 1, wherein the first object and the second object are the same objects.

13. The method of claim 1, wherein the steps are carried out in the order recited.

14. The method of claim 1, wherein the method provides an instrument of mensuration.

15. The method of claim 14, wherein the instrument of mensuration is capable of measuring a value associated with an uncertainty of acquisition associated with the first upgrade.

16. The method of claim 15, wherein the value associated with the uncertainty of acquisition associated with the first upgrade is based at least in part upon time.

17. The method of claim 14, wherein the instrument of mensuration is capable of measuring a value associated with an uncertainty of acquisition associated with the second upgrade.

18. The method of claim 17, wherein the value associated with the uncertainty of acquisition associated with the second upgrade is based at least in part upon time.

19. The method of claim 14, wherein the instrument of mensuration is capable of measuring a value associated with an uncertainty of acquisition associated with the first upgrade and a value associated with an uncertainty of acquisition associated with the second upgrade.

20. The method of claim 19, wherein the value associated with the uncertainty of acquisition associated with the first upgrade is based at least in part upon time and wherein the value associated with the uncertainty of acquisition associated with the second upgrade is based at least in part upon time.

21. A computer implemented method for offering a perishable object for sale, comprising:
(a) utilizing a computer to electronically make an offer from a seller to a buyer for an opportunity to engage in a transaction for a purchase of the perishable object at a single displayed non-zero monetary discounted price and to store the offer in a database, wherein the single displayed non-zero monetary discounted price being the only non-zero monetary discounted price displayed for the purchase of the perishable object, wherein the single displayed non-zero monetary discounted price is set by the seller, and wherein a time that the offer at the non-zero monetary discounted single displayed price is made to the buyer is before a time when the transaction at the non-zero monetary discounted single displayed price would be carried out;
(b) utilizing a computer to electronically receive an acceptance by the buyer, at a time after the making of the offer to the buyer, of the offer of the opportunity to engage in the transaction at the single displayed non-zero monetary discounted price and to store the received acceptance in a database, wherein the acceptance of the offer by the buyer obligates the buyer to purchase the perishable object but does not obligate the seller of the perishable object to sell the perishable object to the buyer such that the commitment of the buyer to purchase the perishable object is made before it is known whether the seller will make the perishable object available for sale; and
(c) utilizing a computer to electronically transact or not transact, at the option of the seller and at a time after acceptance by the buyer of the offer, a purchase of the perishable object by the buyer at the non-zero monetary discounted single price set by the seller;
(d) wherein the perishable object is an object which loses essentially all of its value at a time of expiration of the perishable object.

22. The method of claim 21, wherein the perishable object is a service.

23. The method of claim 22, wherein the service is selected from the group consisting of: (a) a transportation service; and (b) a lodging service.

24. The method of claim 23, wherein the transportation service is selected from the group consisting of: (a) an airline service; (b) a bus service; (c) a rail service; and (d) a ship service.

25. The method of claim 23, wherein the lodging service is for a hotel room.

26. The method of claim 21, wherein at least one document associated with the purchase is generated.

27. The method of claim 21, wherein the perishable object is a product.

28. The method of claim 21, wherein the time when the transaction at the non-zero monetary discounted price would be carried out is a specific time set by the seller and known by the buyer when the offer is made.

29. The method of claim 21, wherein the method provides an instrument of mensuration.

30. The method of claim 29, wherein the instrument of mensuration is capable of measuring a value associated with an uncertainty of acquisition associated with the perishable object.

31. The method of claim 30, wherein the value associated with the uncertainty of acquisition associated with the perishable object is based at least in part upon time.

* * * * *